United States Patent
Matsumoto et al.

(10) Patent No.: US 6,449,856 B1
(45) Date of Patent: *Sep. 17, 2002

(54) LASER PLUMBING DEVICE, LONG MEMBER PLUMBING DEVICE AND LONG MEMBER PLUMBING METHOD

(75) Inventors: Yuuji Matsumoto, Sanda; Tatsusei Minami, Hirakata; Osamu Yoda, Kawasaki; Akira Tanabe, Nishinomiya, all of (JP)

(73) Assignee: Kabushiki Kaisha Matsumotokoumuten, Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/353,151

(22) Filed: Jul. 14, 1999

(30) Foreign Application Priority Data

Jul. 14, 1998 (JP) .............................. 10-199013

(51) Int. Cl.[7] .......................... G01C 9/10; G01C 15/00; G01C 1/00
(52) U.S. Cl. .............................. 33/365; 33/281; 33/282; 33/285; 33/286; 33/DIG. 21
(58) Field of Search .......................... 33/281, 282, 283, 33/284, 285, 286, DIG. 21

(56) References Cited

U.S. PATENT DOCUMENTS

| | | | | | |
|---|---|---|---|---|---|
| 3,471,234 A | * | 10/1969 | Studebaker | ............ | 33/DIG. 21 |
| 3,909,952 A | * | 10/1975 | Lagasse | ........................ | 33/283 |
| 4,751,782 A | * | 6/1988 | Ammann | ................ | 33/DIG. 21 |
| 4,912,851 A | * | 4/1990 | Rando et al. | ........... | 33/DIG. 21 |
| 4,988,192 A | * | 1/1991 | Knittel | ........................ | 33/281 |
| 5,539,990 A | * | 7/1996 | Le | ................ | 33/283 |
| 5,572,797 A | * | 11/1996 | Chase | ........................ | 33/286 |
| 5,644,850 A | * | 7/1997 | Costales | ........................ | 33/282 |
| 5,754,287 A | * | 5/1998 | Clarke | ........................ | 33/286 |
| 5,819,424 A | * | 10/1998 | Ohtomo et al. | ................ | 33/286 |
| 5,983,510 A | * | 11/1999 | Wu et al. | ........................ | 33/286 |
| 6,028,665 A | * | 2/2000 | McQueen | ........................ | 33/286 |
| 6,035,540 A | * | 3/2000 | Wu et al. | ........................ | 33/281 |

* cited by examiner

Primary Examiner—Diego Gutierrez
Assistant Examiner—Yaritza Guadalupe
(74) Attorney, Agent, or Firm—Arent Fox Kintner Plotkin & Kahn

(57) ABSTRACT

A laser plumbing device including a laser beam emitting device; a supporting device for supporting the laser beam emitting device and allowing swinging movements of the laser beam emitting device in a first direction X1 and a second direction Y1; a two-direction drive device for swinging the laser beam emitting device in the first and second directions X1 and Y1; an inclination angle detecting device for detecting an inclination angle of the laser beam emitting direction with respect to the vertical direction; and a controller for controlling the position of the laser beam emitting device by the two-direction drive device so as to change the laser beam emitting direction toward the vertical direction based on the angle detected by the inclination angle detecting device. The long member plumbing device and method utilizing the laser plumbing device.

15 Claims, 7 Drawing Sheets

LASER PLUMBING DEVICE, LONG MEMBER PLUMBING DEVICE AND LONG MEMBER PLUMBING METHOD

The invention is based on patent application No. 10-199013 Pat. filed in Japan, the contents of which are hereby incorporated by reference.

BACKGROUND OF THE INVENTION

1. Field of the Invention

The present invention relates to a laser plumbing device which is used, e.g., in a construction site of a structure for plumbing long members such as a column (e.g., a steel column) and others, and in other words for arranging such a long member in a vertical position (i.e., in a position perpendicular to a horizontal surface), and particularly is used for plumbing the long member which is already arranged or installed in a nearly vertical position. The invention also relates to a long member plumbing device employing the laser plumbing device as well as a method of plumbing a long member.

2. Description of the Background Art

For example, in a construction site of a structure, a steel column or another column is arranged perpendicular to a horizontal surface. In this operation, the column member is first arranged in a predetermined position so that it extends substantially perpendicularly to the horizontal surface, and thus the column member is in the substantially vertical position. Then, plumbing of the column member is performed.

In the prior art, this plumbing operation is performed by using a plumb-bob line or a surveying instrument such as a transit. Further, the plumbing may also be performed by arranging a laser beam emitter on a leg portion of the column member and arranging a target internally provided with a TV camera on an upper portion of the column member.

However, the plumbing method using the plumb-bob line requires an excessively long time until the line stops its movement. Further, the line is likely to move due to wind. Therefore, the plumbing requires a long time. In the case where the surveying instrument such as a transit is used, measurement must be carried out in two directions, which requires a long time. Further, many temporary obstacles are often present on the ground of the construction site so that it is often difficult to arrange the measuring instrument in a desired position. According to the operation employing the laser beam emitter and the target internally provided with the TV camera, the laser beam emitter arranged on the leg portion of the column member emits the laser beam in the vertical direction to the target which is internally provided with the TV camera and is arranged on the upper portion of the column member, and the plumbing is performed while monitoring the laser beam by the TV camera. Therefore, the plumbing accuracy is high. However, the target internally provided with the TV camera is expensive, and installation of the camera on the column member requires a long time and a much cost.

The above problems arise not only in connection with the column members but also in various cases where a long member is plumbed in a predetermined position.

SUMMARY OF THE INVENTION

Accordingly, an object of the invention is to provide a laser plumbing device, which can be used in a plumbing operation of arranging a long member such as a column member in a substantially vertical position and plumbing the provisionally arranged long member, and particularly a laser plumbing device which allows easy handling, and easy and accurate plumbing of the long member.

Another object of the invention is to provide a long member plumbing device, which can be used in a plumbing operation of arranging a long member such as a column member in a substantially vertical position and plumbing the provisionally arranged long member, and particularly a plumbing device which allows easy handling, and easy and accurate plumbing of the long member.

Further, an object of the invention is to provide a long member plumbing method, which can be used in a plumbing operation of arranging a long member such as a column member in a substantially vertical position and plumbing the provisionally arranged long member, and particularly can easily and accurately plumb the provisionally arranged long member.

For achieving the above objects, the invention provides laser plumbing device, a long member plumbing device and a long member plumbing method which will be described below.

(1) Laser Plumbing Device

A laser plumbing device for use in a plumbing operation of arranging a long member in a nearly (in other words, substantially) vertical position and plumbing the arranged long member, including
a laser beam emitting device; a supporting device for supporting the laser beam emitting device arranged in a position for emitting downward a laser beam, and allowing swinging movements of the laser beam emitting device in a first direction crossing a laser beam emitting direction and a second direction crossing the laser beam emitting direction and being perpendicular to the first direction; a two-direction drive device for swinging the laser beam emitting device in the first and second directions; an inclination angle detecting device for detecting an inclination angle of the laser beam emitting direction with respect to the vertical direction; and a controller for controlling the position of the laser beam emitting device by the two-direction drive device so as to change the laser beam emitting direction toward the vertical direction based on the angle detected by the inclination angle detecting device.

(2) A Long Member Plumbing Device

A long member plumbing device including:
the above laser plumbing device according to the invention; and
an arm member provided with a reference position to be opposed to a laser beam outlet of the laser beam emitting device in the laser plumbing device, being capable of carrying the laser plumbing device such that the laser beam outlet is opposed to the reference position, and allowing fixing to an upper portion of the long member.

(3) Long Member Plumbing Method

A long member plumbing method for use in a plumbing operation of arranging a long member in a nearly (in other words, substantiall) vertical position and plumbing the arranged long member, including the steps of:
preparing the above laser plumbing device according to the invention;
fixing an arm member for carrying the laser plumbing device on an upper portion of the long member, the arm member being provided with a reference position to be opposed to a laser beam outlet of the laser beam emitting device in the laser plumbing device, and the reference position and a central axis of the long member being spaced from each other by a predetermined distance α in a predetermined direction X perpendicular to the central axis and by a predetermined distance β in a direction Y perpendicular to the central axis and the predetermined direction X;

mounting the laser plumbing device on the arm member such that the laser beam outlet of the laser beam emitting device is opposed to the reference position;

providing a lower reference mark on a horizontal surface continuing to the lower portion of the long member or a horizontal surface lower than the foregoing horizontal surface, the lower reference mark being spaced from a point P to be coincident with the central axis of the long member by the distance a in a predetermined horizontal direction X' and by the distance in a horizontal direction Y' perpendicular to the direction X'; and emitting the laser beam downward from the laser beam emitting device of the laser plumbing device while keeping the central axis of the long member on the foregoing point P, and plumbing the long member by adjusting the position of the long member such that the laser beam is projected onto the lower reference mark.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
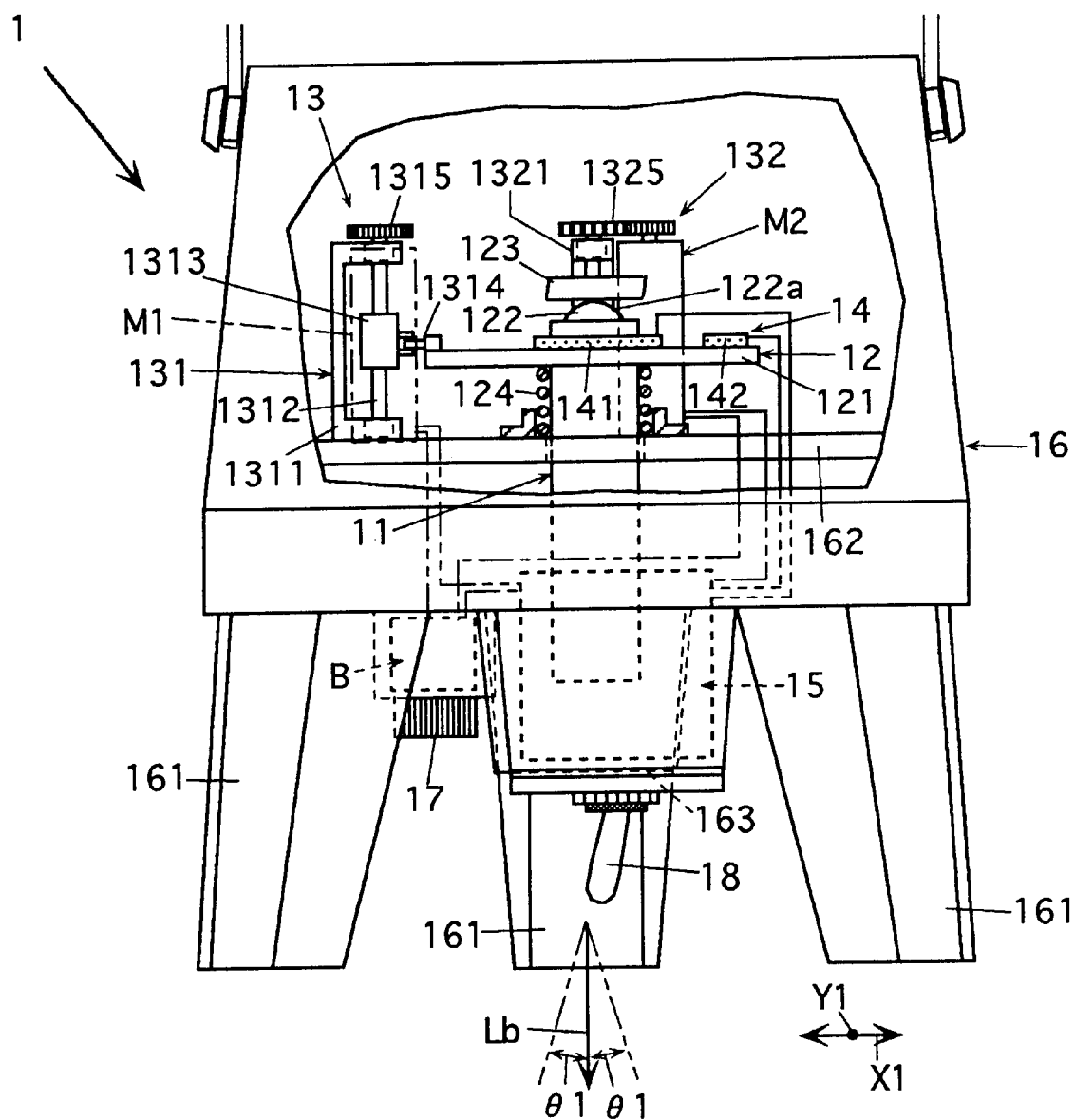
FIG. 1 is an elevation showing an example of a laser plumbing device according to the invention with a certain part cut away.

A laser plumbing device of an embodiment of the invention includes a laser beam emitting device, a supporting device for supporting the laser beam emitting device, a two-direction drive device for the laser beam emitting device, an inclination angle detecting device for detecting an inclination angle of a laser beam emitting direction of the laser beam emitting device with respect to the vertical direction, and a controller for controlling a position of the laser beam emitting device.

The support device for the laser beam emitting device supports the laser beam emitting device arranged in a position for emitting downward a laser beam, and allows swinging movements of the laser beam emitting device in a first direction crossing the laser beam emitting direction and a second direction crossing the laser beam emitting direction and being perpendicular to the first direction.

The two-direction drive device can swing the laser beam emitting device in the first and second directions.

The controller controls the position of the laser beam emitting device by the two-direction drive device so as to change the laser beam emitting direction toward the vertical direction based on an angle detected by the inclination angle detecting device.

A long member plumbing device of the embodiment of the invention includes the laser plumbing device described above; and an arm member provided with a reference position to be opposed to a laser beam outlet of the laser beam emitting device in the laser plumbing device, being capable of carrying the laser plumbing device such that the laser beam outlet is opposed to the reference position, and allowing fixing to an upper portion of the long member.

A long member plumbing method of the embodiment of the invention includes the steps of preparing the above laser plumbing device according to the invention; fixing an arm member for carrying the laser plumbing device on an upper portion of the long member, the arm member being provided with a reference position to be opposed to a laser beam outlet of the laser beam emitting device in the laser plumbing device, and the reference position and a central axis of the long member being spaced from each other by a predetermined distance α in a predetermined direction X perpendicular to the central axis and by a predetermined distance β in a direction Y perpendicular to the central axis and the predetermined direction X; mounting the laser plumbing device on the arm member such that the laser beam outlet of the laser beam emitting device is opposed to the reference position; providing a lower reference mark on a horizontal surface continuing to the lower portion of the long member or a horizontal surface lower than the foregoing horizontal surface, the lower reference mark being spaced from a point P to be coincident with the central axis of the long member by the distance α in a predetermined horizontal direction X' and by the distance a in a horizontal direction Y' perpendicular to the direction X'; and emitting the laser beam downward from the laser beam emitting device of the laser plumbing device while keeping the central axis of the long member on the foregoing point P, and plumbing the long member by adjusting the position of the long member such that the laser beam is projected onto the lower reference mark.

The laser plumbing device described above may be directly attached to an upper portion (typically, a top) of the long member. This long member may be a column member such as a steel column or another long member, which is already arranged in a predetermined position or is not yet arranged in the predetermined position. Alternatively, the laser plumbing device may be fixed to the long member via an appropriate arm member or the like, which is fixed to the upper portion of the long member and carries the laser plumbing device.

This fixing of the laser plumbing device to the long member is performed such that the laser beam outlet of the laser beam emitting device is opposed to a reference position. The reference position is spaced by the predetermined distance α from the longitudinally extending central axis of the long member in the predetermined direction X perpendicular to the central axis, and is spaced by the predetermined distance β from the central axis in the direction Y perpendicular to both the central axis and the direction X.

The long member plumbing device and the plumbing method described above use the arm member, which is provided with the reference position to be opposed to the laser beam outlet of the laser beam emitting device. The arm member is fixed to the upper portion of the long member. The arm member thus fixed is located such that the reference position is spaced from the longitudinally extending central axis of the long member by the predetermined distance α in the predetermined direction X perpendicular to the central axis, and is spaced from the same central axis by the predetermined distance β in the direction Y perpendicular to both the central axis and the direction X.

After or before fixing the arm member to the long member, the laser plumbing device is mounted on the arm member. The laser beam outlet of the laser beam emitting device thus mounted is opposed to the reference position.

The lower reference mark is provided on the horizontal surface continuing to the lower portion of the long member (typically, the leg of the long member). The lower reference mark is located in the position, which is spaced by the predetermined distance α in the predetermined horizontal direction X' from the point P to be coincident with the central axis of the long member, and is spaced by the predetermined distance β in the horizontal direction Y' perpendicular to the direction X' from the point P.

When the plumbing is to be carried out on the long member jointed to a plumbed long member, i.e., another long member which is already plumbed, the lower reference mark may be provided on the horizontal surface continuing to the lower portion (typically, the leg portion) of the long member to be plumbed. The lower reference mark alternatively may be provided on the horizontal surface in a further lower position (usually, the horizontal surface continuing to the lower portion of the plumbed long member). In this case, the lower reference mark which was used when plumbing the first long member may be utilized in the operation of plumbing the long member jointed to the first long member.

In this manner, the long member is plumbed such that the central axis thereof is coincident with the point P, and the reference position (upper reference position) which is spaced by the distances α and β from the central axis of the long member, and is opposed to the laser beam outlet, is substantially vertically aligned with the lower reference mark, and thereafter the laser beam emitting device of the laser plumbing device emits the laser beam downward, and the plumbing is performed to project the laser beam onto the lower reference mark.

In this plumbing operation, when the position of the long member is adjusted, the position of the laser plumbing device changes. Thereby, the controller operates the two-direction drive device in the laser plumbing device so that the position of the laser beam emitting device is controlled to emit the laser beam downward in the vertical direction. Thus, the controller of the laser plumbing device controls the position of the laser beam emitting device by sending an instruction to the two-direction drive device such that the inclination angle detected by the inclination angle detecting device changes toward zero, and therefore the direction of the laser beam changes toward the vertical direction. Thereby, the position of the laser beam emitting device is controlled, and the laser beam is always emitted downward in the vertical direction. Thus, the laser beam is emitted downward in the vertical direction similarly to a conventional plumb bob which is always kept in the vertical direction. Accordingly, the long member can be easily and accurately plumbed by performing the plumbing so that the laser beam may be emitted onto the lower reference mark.

In the plumbing method described above, (1) the step of fixing the arm member to the upper portion of the long member, (2) the step of mounting the laser plumbing device on the arm member, and (3) the step of providing the lower reference mark may be carried out in an arbitrary order, and some of these steps may be performed at the same time provided that no disadvantage occurs.

The arm member fixing step (1) and the laser plumbing device mounting step (2) may be effected on the upper portion of the long member which is already arranged in the predetermined position, and alternatively may be effected on the long member, which is not yet arranged in the predetermined position and thus is laid on a ground. Thereby, the plumbing operation can be easily performed at less expense in time and cost.

The supporting device of the laser beam emitting device in the laser plumbing device is required to support the laser beam emitting device to allow the swinging in the first direction crossing the laser beam emitting direction as well as the swinging in the second direction, which crosses the laser beam emitting direction and is perpendicular to the first direction. For example, the supporting device may have a simple structure formed of, e.g., a leveling base carrying the laser beam emitting device, a spherical member provided on the leveling base, projected upward and having a spherical or nearly spherical top surface, a spherical surface contact member being in contact with the top surface of the spherical member and located above the leveling base, and a spring elastically pushing and supporting the leveling base upward for keeping the top surface of the spherical member in contact with the spherical surface contact member and allowing swinging movements of the leveling base around the contact point between the spherical member and the spherical surface contact member in the first and second directions.

The two-direction drive device in the laser plumbing device is merely required to allow the swinging movements of the laser beam emitting device in the first and second directions, and may include, for example, a first motor for swinging the leveling base in the first direction, a first transmission mechanism for transmitting a drive force of the first motor to the leveling base for swinging the leveling base in the first direction, a second motor for swinging the leveling base in the second direction, and a second transmission mechanism for transmitting a drive force of the second motor to the leveling base for swinging the leveling base in the second direction.

The controller may have such a structure that allows the turn-on of the laser beam emitting device and the control of the position of the laser beam emitting device by the two-direction drive device when the angle detected by the inclination angle detecting device is lower than or equal to the predetermined angle, and stops the operation of the laser beam emitting device and the two-direction drive device when the angle detected by the inclination angle detecting device is larger than the predetermined angle.

In this case, when the direction of the laser beam emitted from the laser beam emitting device is inclined by an angle exceeding the predetermined angle with respect to the vertical direction, the laser beam emitting device is not turned on, or will be turned off when it has been turned on. Also, the two-direction drive device does not operate. The state where the laser beam is inclined by the angle exceeding the predetermined direction with respect to the vertical direction is naturally caused by the state where the arranged long member is inclined with respect to the vertical direction to a large extent. As a result, the above control can inhibit the start of the time-consuming and difficult operation for correcting a large inclination of the long member with respect to the vertical direction. Thus, the above control tends to start the plumbing on the long member which is in the position near to the vertical position. The long member may be arranged in the predetermined position after the laser plumbing device is attached to the long member which is, for example, laid on the ground. In this case, the laser plumbing device does not operate when the member is in the laid position, or will stop the operation after a temporary operation.

The arm member carrying the laser plumbing device, which is used in the foregoing long member plumbing device and method, may be adapted to allow easy attachment and removal of the arm member with respect to the long member (particularly, the long member such as a steel column or the like made of a magnetic material), and for this purpose, may employ a magnet device attracted onto the long member. The magnet device may be a permanent magnet, or a known magnet device to be turned on/off by a lever.

The arm member may be provided with a scale providing a standard for positioning when fixing the arm member to the long member.

Specific examples of the laser plumbing device, the long member plumbing device and the long member plumbing method will now be described with reference to the drawings.

Figure 3:
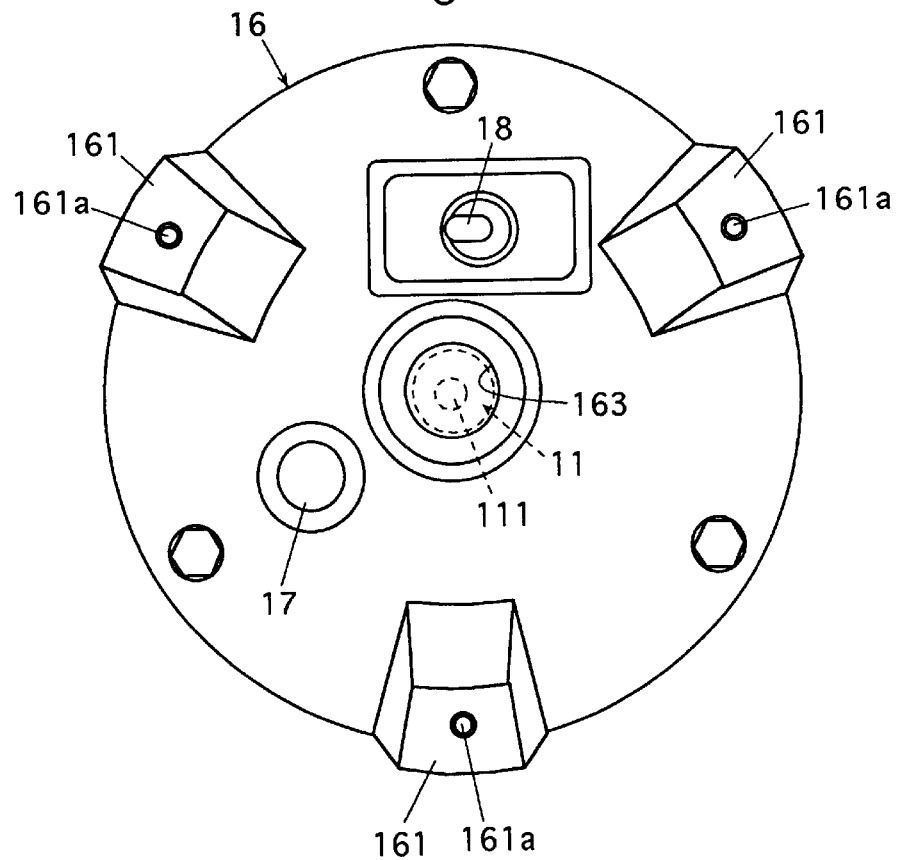
FIG. 3 is a bottom view of the laser plumbing device shown in FIG. 1.

FIG. 1 is an elevation showing by way of example the laser plumbing device with a certain part cut away, and FIG. 3 is a bottom view of the laser plumbing device.

Figure 2:
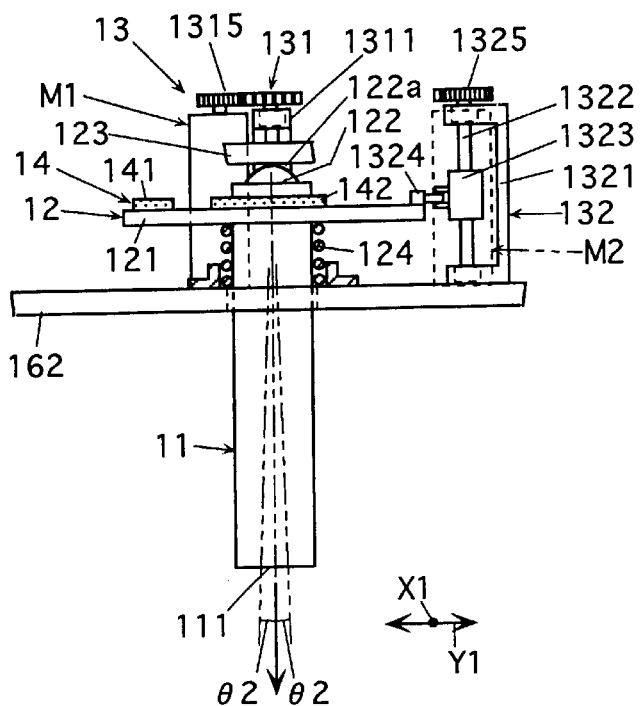
FIG. 2 is a right side view of the structure in FIG. 1 including a laser beam emitting device, a support device thereof and a two-direction drive device.

The laser plumbing device 1 shown in the figures includes, a laser beam emitting device 11 including a laser generator, a lens and others (not shown), a supporting device 12 supporting the device 11, a two-direction drive device 13 swinging the support device 12 in two directions, an inclination angle detecting device 14 and a controller 15, which controls the operation of the two-direction drive device 13 for controlling the position of the laser beam emitting device 11 based on information of the inclination angle detected by the inclination angle detecting device 14. These are arranged within a casing 16. FIG. 2 shows a right side of the structure including the laser beam emitting device 11, support device 12 and two-direction drive device 13.

The casing 16 is provided with a battery box 17 and a switch 18 for turning on/off the power supply. The casing 16 has three legs 161, each of which is provided at its lower surface with a screw hole 161a (see FIG. 3).

The support device 12 is provided with a leveling base 121 carrying the laser beam emitting device 11 as shown in FIGS. 1 and 2. The device 11 fixed to the leveling base 121 has a vertically long form extending through a central portion of the leveling base 121. The support device 12 has a spherical member 122 arranged on the top of the device 11 fixed to the leveling base 121. The spherical member 122 projects upward, and has an upper end surface 122a of a spherical form. The top spherical surface 122a of the spherical member 122 is pressed by a spring 124 against a spherical surface contact member 123 arranged in a fixed position above the leveling base 121.

A frame 162 is arranged in the fixed position within the casing 16, and is located under the leveling base 121. The laser beam emitting device 11 fixed to the leveling base 121 is fitted into the frame 162 with a sufficient space therebetween, and a laser beam outlet 111 of the device 11 is opposed to a window 163 on the lower surface of the casing 16.

The spring 124. is arranged between the lower surface of the leveling base 121 and the top surface of the frame 162, and surrounds the shank or body portion of the laser beam emitting device 11. In this manner, the spring 124 elastically pushes and supports the leveling base 121 upward so that the top spherical surface 122a of the spherical member 122 is pressed against the spherical surface contact member 123.

Owing to the above structure of the support device 12, the leveling base 121 and the laser beam emitting device 11 mounted thereon are arranged such that the laser beam emitting device 11, which is in the position for emitting the laser beam downward as shown in FIG. 1, can swing and reciprocate in first and second directions X1 and Y1 around a contact between the spherical member top surface 122a and the spherical surface contact member 123. The first direction X1 crosses the laser beam emitting direction (i.e., the direction of the emitted laser beam). The second direction Y1 crosses the laser beam emitting direction and is perpendicular to the first direction X1.

The two-direction drive device 13 includes, as shown in FIGS. 1 and 2, a first motor M1, a first transmission mechanism 131 transmitting a drive force of the first motor M1 to the leveling base 121, a second motor M2, and a second transmission mechanism 132 transmitting a drive force of the second motor M2 to the leveling base 121. A combination of the motor M1 and the first transmission mechanism 131 as well as a combination of the motor M2 and the second transmission mechanism 132 are arranged outside the leveling base 121 with an angular space of 90 degrees from each other, and each are mounted on the frame 162 in the fixed position.

The first transmission mechanism 131 includes a bearing unit 1311 fixed to and projected upward from the frame 162, a longitudinal screw rod 1312 rotatably carried by the unit 1311, an internal thread member 1313 engaged with the screw rod 1312, and a link mechanism 1314 coupling the internal thread member 1313 to the outer periphery of the leveling base 121. The top end of the longitudinal screw rod 1312 is coupled to the shaft of the motor M1 via a gear transmission mechanism 1315.

The second transmission mechanism 132 includes a bearing unit 1321 fixed to and projected upward from the frame 162, a longitudinal screw rod 1322 rotatably carried by the unit 1321, an internal thread member 1323 engaged with the screw rod 1322, and a link mechanism 1324 coupling the internal thread member 1323 to the outer periphery of the leveling base 121. The top end of the longitudinal screw rod 1322 is coupled to the shaft of the motor M2 via a gear transmission mechanism 1325.

According to the above structure, the two-direction drive device 13 can operate such that the motor M1 vertically moves the internal thread member 1313, and thereby swings via the link mechanism 1314 the leveling base 121 and therefore the laser beam emitting device 11 carried thereon in the first direction X1 against the spring 124. Further, the motor M2 can vertically move the internal thread member 1323, and thereby can swing via the link mechanism 1324 the leveling base 121 and therefore the laser beam emitting device 11 carried thereon in the second direction Y1 against the spring 124.

The inclination angle detecting device 14, which detects the inclination angle of the laser beam emitting direction with respect to the vertical direction, is formed of two angle sensors 141 and 142 mounted on the leveling base 121. The sensor 141 detects an inclination angle θ1 (see FIG. 1) in the first direction X1, and sensor 142 detects an inclination angle θ2 (see FIG. 2) in the second direction Y1.

Each of the sensors 141 and 142 has a known structure, which is generally referred to, e.g., as an "electrolyte detecting device", although not restricted thereto. This structure includes a liquid ball which can move in accordance with an inclination with respect to the horizontal direction, similarly to a general level, and can issue an electric signal corresponding to the position of the moving liquid ball, whereby the inclination angle can be accurately detected.

Figure 8:
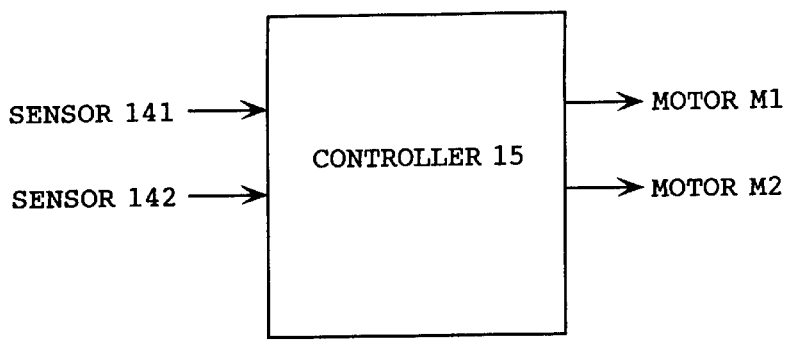
FIG. 8(A) is a schematic block diagram of an electric circuit of the laser plumbing device shown in FIG. 1.
FIG. 8(B) is a flow chart showing by way of example an operation a controller in the laser plumbing device.
FIG. 8(C) is a flow chart showing another example of the operation of the controller.
Figure 8:
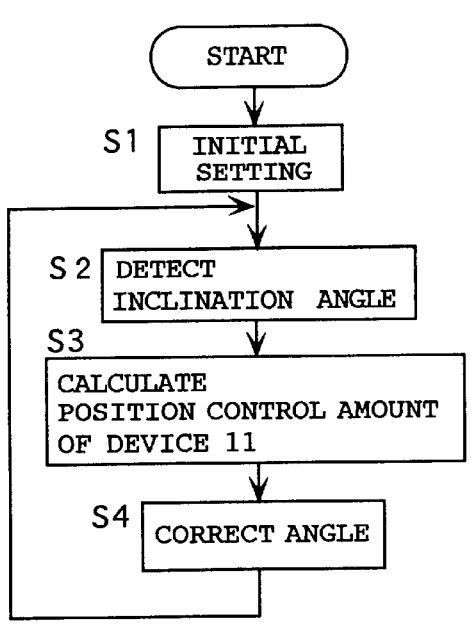
Figure 8:
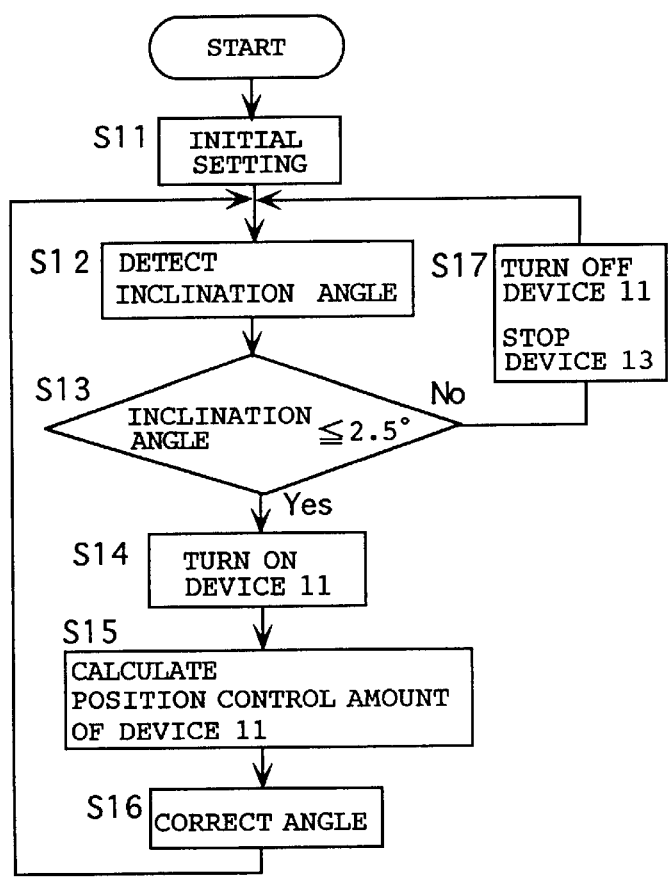

As shown in FIG. 8(A), the sensors 141 and 142 issue the detected angle information to the controller 15, and each of the motors M1 and M2 of the two-direction drive device 13 operates based on the instruction issued from the controller 15.

The controller performs the control based on the inclination angles θ1 and θ2, which are defined in the first and second directions X1 and Y1 by the direction of the laser beam emitted from the laser beam emitting device 11 with respect to the vertical direction, and are detected by the sensors 141 and 142 of the inclination angle detecting device 14, respectively. This control is performed to reduce both the inclination angles θ1 and θ2 to zero, and therefore to change the direction of the laser beam emitted from the laser beam emitting device 11 toward the vertical direction. For this position control, the controller arithmetically operates the amount of position control (i.e., the amount to be corrected) of the device 11, and drives the motors M1 and M2 of the two-direction drive device 13 based on the result of the arithmetic operation. In this manner, the controller 15 controls the position of the laser beam emitting device 11 to change the laser beam emitting direction to the vertical direction.

The laser plumbing device 1 described above can be used in the long member plumbing operation, which will be described later, by placing the battery B in the battery box 17 of the casing 16 and turning on the switch 18.

Description will now be given on an example of the long member plumbing device according to the invention as well as the long member plumbing method according to the invention.

Figure 4:
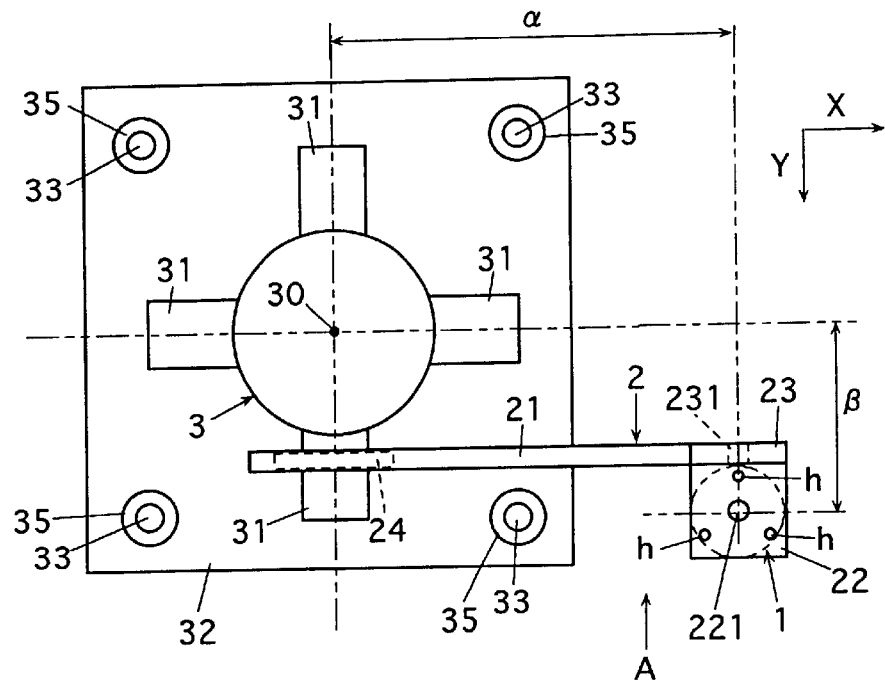
FIG. 4 is a plan showing an example of an operation of arranging a steel column in a predetermined position and plumbing the same.
Figure 6:
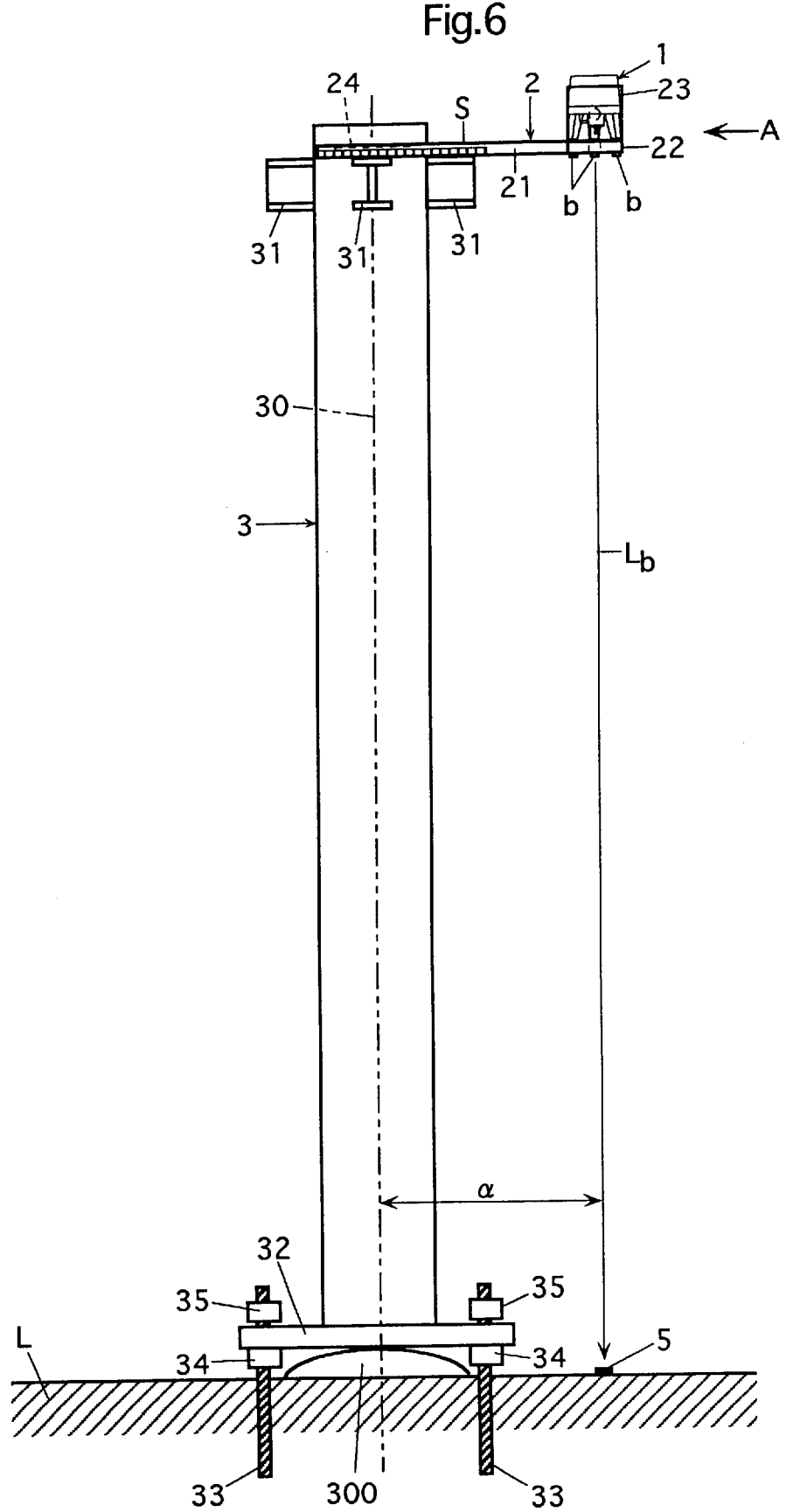
FIG. 6 is a side view showing the steel column plumbing operation shown in FIG. 4.
Figure 9:
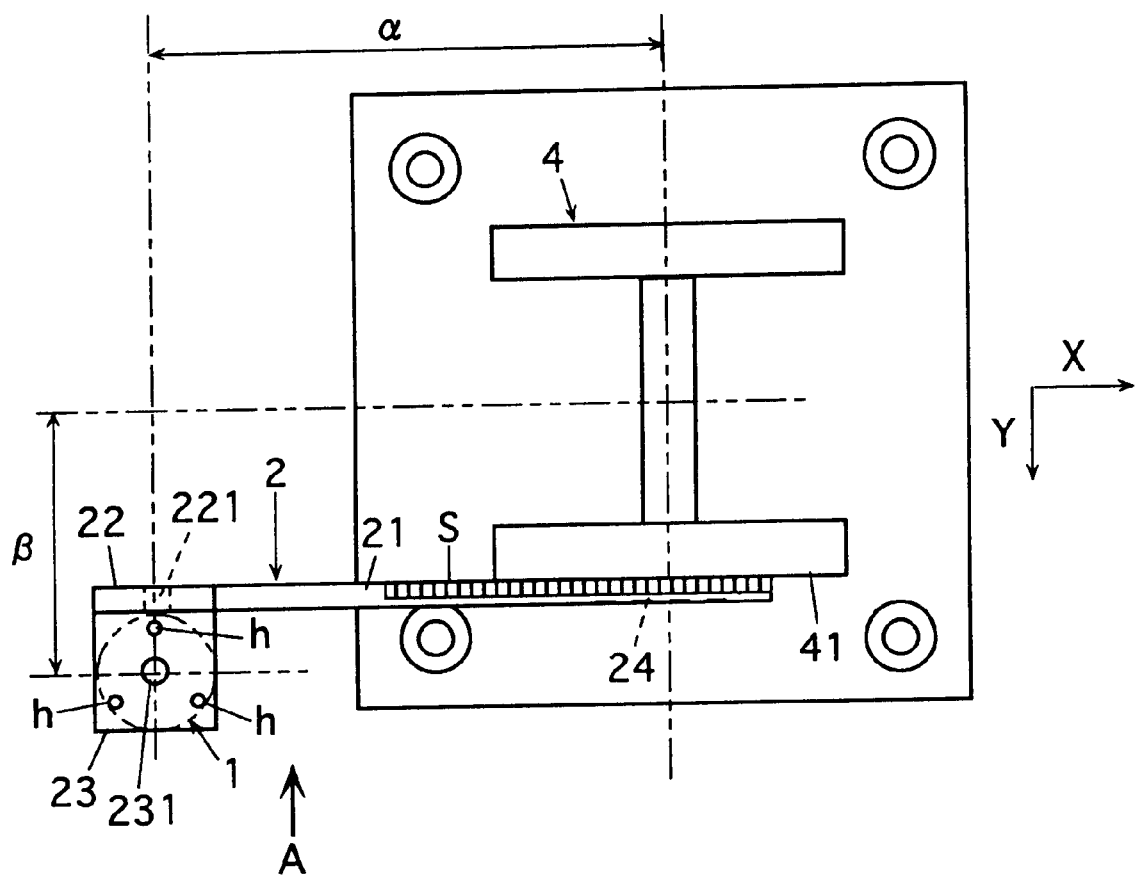
FIG. 9 is a plan showing an operation of arranging a steel column made of H-section steel in a predetermined position and plumbing the same.

FIG. 4 is a plan showing an operation of arranging a steel column 3 in a predetermined position and plumbing the same. FIG. is a plan showing a ground before plumbing the steel column 3. FIG. 6 is a side view showing an operation of plumbing the steel column shown in FIG. 4. FIG. 9 is a plan showing an operation of arranging a steel column 4 made of H-section steel, and then plumbing the same.

As shown in FIGS. 4, 5, 6 and 9, a steel column plumbing device A is formed of the foregoing laser plumbing device 1 and an arm member 2.

The arm member 2 is formed of a long ruler member 21 provided at one of its side surfaces with a scale S (see FIG. 6) as well as two laser plumbing device carrying plates 22 and 23, which are perpendicular to each other and are arranged on one end of the ruler member 21. The plates 22 and 23 arranged perpendicular to each other are connected to the ruler member 21 such that the edge line defined between them is substantially located on an extension of the ruler member 21. The ruler member 21 is provided with a magnet device 24, which is formed of a permanent magnet in this embodiment.

The plates 22 and 23 are provided at their central positions with reference through-holes 221 and 231 representing the reference positions, respectively. Each of the plates 22 and 23 is provided with three unthreaded bolt holes h.

According to this plumbing device A, the laser plumbing device 1 is carried on one of the plates 22 and 23, and is fixed to the arm member 2 by bolts b (see FIG. 6), which are inserted through the unthreaded bolt holes h and are engaged with the threaded holes 161a in the lower surfaces of the three legs 161 of the plumbing device casing 16. In this fixed state, the laser beam outlet 111 of the laser beam emitting device 11 in the laser plumbing device 1 is opposed to the reference aperture 221 or 231 through the window 163 in the plumbing device casing 16.

Figure 5:
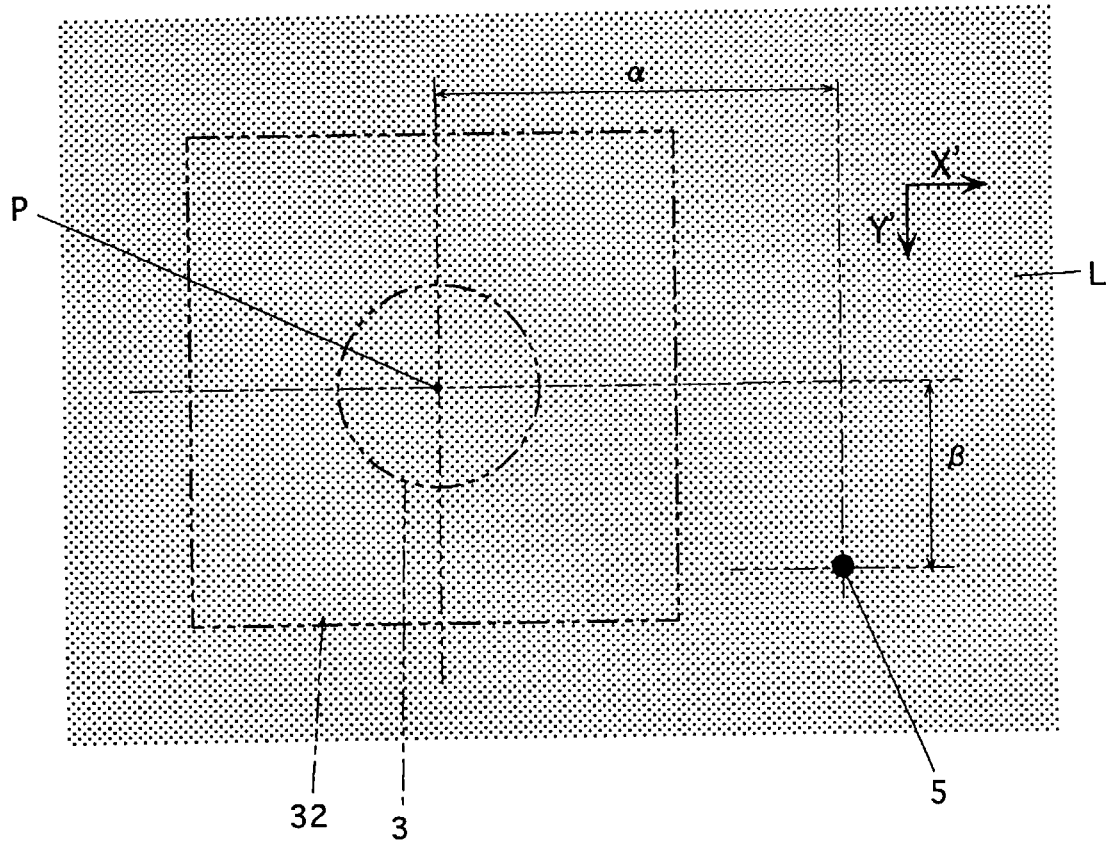
FIG. 5 is a plan of a ground before arranging the steel column.

In the plumbing operation shown in FIGS. 4 through 6, the laser plumbing device 1 is mounted on the plate 22, and the ruler member 21 is fixed by the magnet device 24 to a top surface of a beam connecting member 31, which is already connected to the upper portion of the column 3 and has an H-shaped section. The scale S is utilized for positioning the arm member 2 when attaching the member 2 to the upper portion of the column.

In the plumbing operation shown in FIG. 9, the laser plumbing device 1 is mounted on the plate 23, and the ruler member 21 is fixed by the magnet device 24 to one side surface 41 of the upper portion of the H-section steel column 4. The scale S is also used for positioning the arm member 2 on the upper portion of the column.

The plates 22 and 23 of the arm member 2 can be selected for use, depending on the form or the like of the upper portion of the long member to which the arm member 2 is to be fixed.

Description is further given on the plumbing operation shown in FIGS. 4, and 6. The plumbing device A described above is conveyed to an operation site, and is fixed to the steel column 3 which has a circular section and is laid on the ground. The beam connecting members 31 are already fixed on the peripheral surface of the upper portion of the column 3, and are projected in the four radial directions of the column 3 angularly spaced by 90 degrees from each other, respectively. The device A is fixed, e.g., to the upper surface of one of the beam connecting members 31. This fixing operation can be easily and simply performed by utilizing the positioning line, scale or the like, which is provided in the predetermined position on the upper surface of the member 31, as well as the scale S on the ruler member 21 of the arm member 2.

Fixing of the arm member 2 is performed such that the reference aperture 221 provided in the laser plumbing device carrying plate 22 (more strictly, the center of the aperture 221) is located in the position spaced from the central axis 30 of the steel column 3 by the predetermined distance a in the predetermined direction X perpendicular to the central axis 30 and by the predetermined distance β in the direction Y perpendicular to both the central axis 30 and the direction X.

The laser plumbing device 1 is fixed to the plate 22 such that the laser beam outlet 111 of the laser beam emitting device 11 is opposed to the reference aperture 221, as already described.

The battery B is placed in the battery box 17.

On the ground L side, as shown in FIG. 5, the lower reference mark is provided in the position on the horizontal surface (ground L in this example) continuing to the steel column leg portion (steel column leg plate in this example). This position is spaced from the intended point P of the central axis 30 of the steel column 3 by the foregoing distance α in a predetermined horizontal direction X' and the foregoing distance β in a horizontal direction Y' perpendicular to the direction X'. As shown in FIG. 6, the ground L is provided at its upper surface with a raised portion 300 having a spherical upper surface. Also, a plurality of (four in this example) anchor bolts 33 are fixed to positions outside the raised portion 300, and nuts 34 engaged with the bolts 33 are located on the substantially same horizontal surface.

The steel column 3 carrying the device A is arranged such that the central axis 30 is coincident with the point P on the ground side, the leg plate 32 of the column 3 is located on the raised portion 300, and the reference aperture 221 spaced from the central axis 30 of the column 3 by the distances α and β is located vertically above the lower reference mark 5. Before this operation, the switch 18 of the laser plumbing device 1 is turned on.

The anchor bolts 33 are fitted through the bolt apertures on the four corners of the leg plate 32. The upper nuts 35 are loosely engaged to the upper portions of the anchor bolts 33 projected from the leg plate 32, respectively.

In this manner, the leg plate 32 is supported by the nuts 34 engaged with the anchor bolts 33 and the raised portion 300, and thereby the column 3 is arranged in the nearly vertical or upright position allowing the plumbing.

Then, the laser beam emitting device 11 of the laser plumbing device 1 emits the laser beam Lb downward, and the plumbing is performed such that the laser beam may be projected onto the lower reference mark 5. This plumbing operation is performed by raising or lowering each nut 34 on the anchor bolt 33, if necessary. The raised portion 300 can carry a large part of the column weight, and therefore facilitates the plumbing operation. However, the raised portion 300 is not essential.

In this plumbing operation, the position (i.e., angular position) of the column 3 is adjusted, and thereby the position of the laser plumbing device 1 changes. In this operation, the two-direction drive device 13 in the laser plumbing device 1 operates under the control by the controller to control the position of the leveling base 121 so that the direction of the laser beam changes toward the vertical direction. Thus, the controller of the laser plumbing device 1 sends the instruction to the two-direction drive device 13 for controlling the position of the leveling base 121 and therefore the position of the laser beam emitting device 11 mounted thereon so that the inclination angle detected by the inclination angle detecting device 14 may change toward 0, and thus the direction of the laser beam may change toward the vertical direction. In this manner, the laser beam emitting device 11 is controlled so that the laser beam may always be directed vertically downward. Similarly to a conventional plumb bob which is always directed vertically downward, the laser beam is directed vertically downward. Accordingly, by performing the plumbing so that the laser beam may be emitted onto the lower reference mark 5, the column 3 can be easily plumbed to be accurately vertical. After the plumbing, the nuts 34 and 35 on the anchor bolts 33 are tightened against the leg plate 32 while keeping the plumbed position, whereby the plumbing of the column 3 is completed.

The controller includes a computer, and the operation thereof will now be described with reference to FIG. 8(B).

When the switch 18 and therefore the power supply are turned on, the program starts, and initial setting is performed (step S1). Here, the laser beam emitting device 11 is turned on. Then, the inclination angle detecting device 14 performs the processing to detect the inclination angle of the laser beam emitting direction with respect to the vertical direction (step S2), and the amount of the required position control of the laser beam emitting device 11 is calculated or arithmetically operated (step S3). Based on this operation result, the two-direction drive device 13 executes the angle correcting processing (position control processing) (step S4). During the plumbing, the steps S2 through S4 are repeated.

The controller 15 may have such a structure that the controller 15 allows the turn-on of the laser beam emitting device 11 as well as the position control of the laser beam emitting device 11 by the two-direction drive device 13 when the inclination angle detected by the inclination angle detecting device 14 (in this example, at least one of the inclination angles detected by the sensors 141 and 142) is lower than or equal to the predetermined angle (2.5 degrees in this embodiment), and does not operate the laser beam emitting device 11 and the two-direction drive device 13 when the detected inclination angle exceeds the predetermined angle.

In this case, when the direction of the laser beam emitted from the laser beam emitting device 11 is inclined with respect to the vertical direction by an angle larger than the predetermined angle described above, the laser beam emitting device 11 is not turned on, and the two-direction drive device 13 does not operate. When the laser plumbing device 1 is attached to the column 3 laid on the ground before being arranged in the upright position, therefore, the laser plumbing device 1 does not operate while the column 3 is in the laid position. Even after the column 3 is arranged in the upright position before the plumbing, the direction of the laser beam may be inclined with respect to the vertical direction by an angle exceeding the predetermined angle, and this situation occurs when the arranged column 3 is inclined with respect to the vertical direction by a large angle. Consequently, it is possible to inhibit the start of the operation when the column 3 is inclined with respect to the vertical direction by a large angle, and thus it is possible to inhibit the start of the operation which will require a long time and will be difficult. Thus, the plumbing operation can be effectively started from the state that the column 3 is in the position closer to the vertical position.

The controller 15 having the above structure operates as shown in the flow chart of FIG. 8(C).

When the switch 18 and therefore the power supply are turned on, the program starts, and the initial setting is performed (step S11). Then, the inclination angle detecting device 14 detects the inclination angle of the emitted laser beam with respect to the vertical direction (step S12). When the detected angle is 2.5 degrees or less, the laser beam emitting device 11 is turned on (steps S13 and S14), the amount of the required position control of the laser beam emitting device 11 is arithmetically operated (step S15). Based on this operation result, the two-direction drive device 13 executes the angle correcting processing (position control processing) (step S16). When the angle detected in the step S13 is larger than 2.5 degrees, the laser beam emitting device 11 is turned off and the two-direction drive device 13 (motors M1 and M2) stops. Then, the operation returns to the step S12. During the plumbing, the above operations are repeated.

The structure of the controller is not restricted to the above. In summary, the structure is required as follows. The control is performed based on the inclination angles θ1 and θ2 of the laser beam, which is emitted from the laser beam emitting device, in the first and second directions X1 and Y1 with respect to the vertical direction. The arithmetic operation is performed to obtain the amount of the position control (position correction) of the device 11 which is required for changing each inclination angle toward zero, and in other words, changing the direction of the laser beam emitted from the laser beam emitting device 11 toward the vertical direction. The motors M1 and M2 of the two-direction drive device 13 are driven based on the result of the arithmetic operation to control the position of the laser beam emitting device 11 so as to change the laser beam emitting direction toward the vertical direction.

Figure 7:
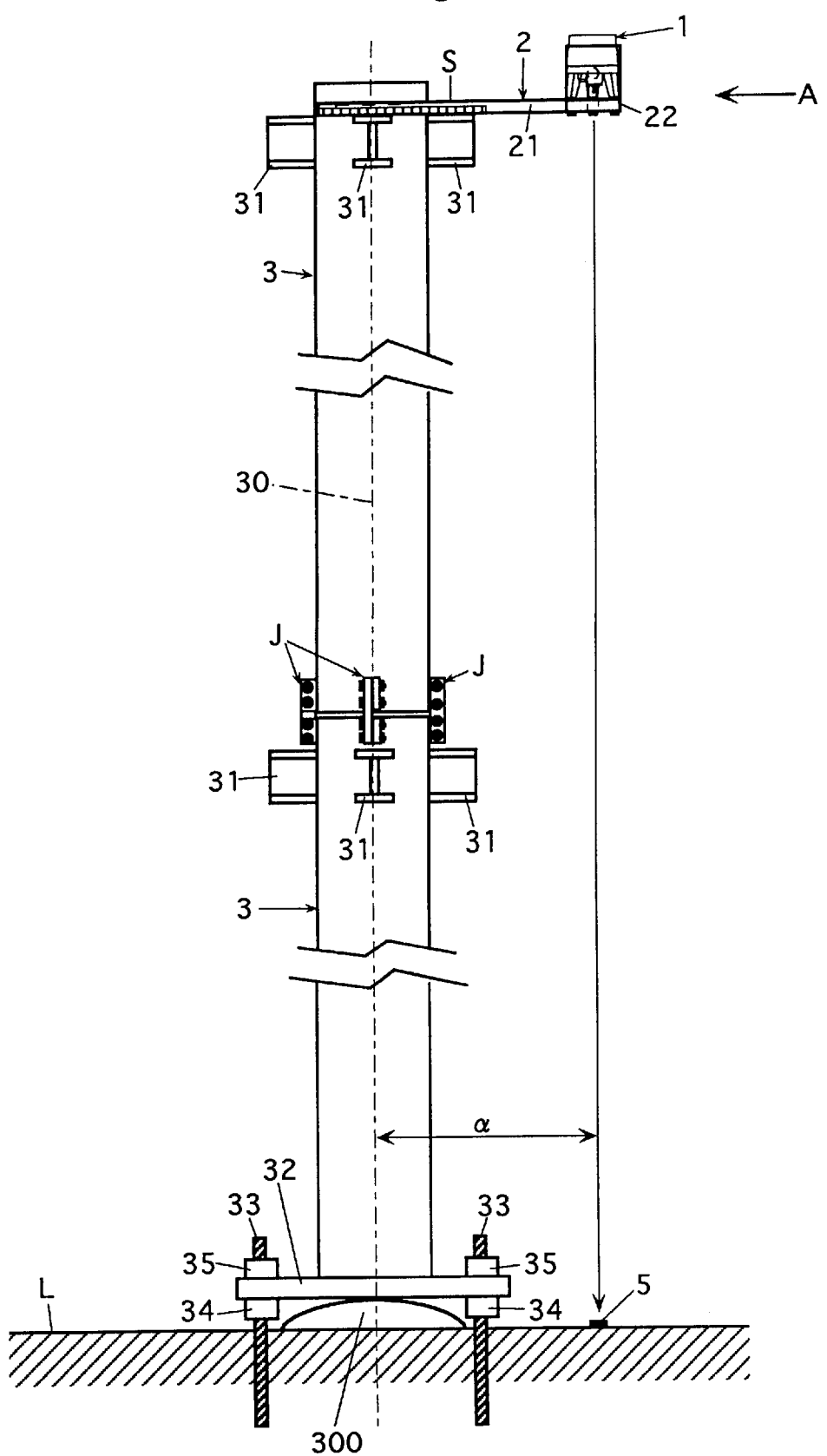
FIG. 7 is a side view showing a plumbing operation for a column jointed to a plumbed column.

Description has been given on the case where the column 3 is plumbed on the ground L. As shown in FIG. 7, however, the column 3 to be plumbed may be a column jointed to another column 3 which is already plumbed. In this case, the plumbing device A is mounted on the upper portion of the upper column 3 to be plumbed. The lower reference mark may be provided on the horizontal surface continuing to the lower portion of the upper column 3 to be plumbed. Alternatively, the lower reference mark which was used for plumbing the first and therefore lower column 3 can be utilized also for plumbing the upper column 3. In this plumbing operation, the lower portion of the upper column 3 to be jointed is provisionally jointed to the upper portion of the lower column 3, which is already plumbed, via a joint J formed of bolts, nuts and joint plates as shown in FIG. 7, and the plumbing is performed, e.g., by applying a wedge or the like to an appropriate position between the upper and lower columns. After the plumbing is completed, the bolts and nuts for the joint J are tightened. If necessary, the upper and lower columns may be welded together.

The plumbing operation for arranging and positioning the column 3 as described above can be likewise executed on the column 4 having the H-shaped section shown in FIG. 9.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A laser plumbing device for use in a plumbing operation of arranging a long member in a substantially vertical position and plumbing the arranged long member, comprising:

a laser beam emitting device; a supporting device for supporting said laser beam emitting device arranged in a position for emitting a laser beam vertically downward, and allowing swinging movements of said laser beam emitting device in a first direction crossing a laser beam emitting direction and a second direction crossing the laser beam emitting direction and being perpendicular to said first direction; a two-direction drive device for swinging said laser beam emitting device in said first and second directions; an inclination angle detecting device for detecting an inclination angle of said laser beam emitting direction with respect to a vertical axis; and a controller for controlling the position of said laser beam emitting device by said two-direction drive device so as to change said laser beam emitting direction toward the vertical axis based on a signal output by said inclination angle detecting device;

wherein said supporting device of said laser beam emitting device has a leveling base carrying said laser beam emitting device; a spherical member provided on said leveling base, projected upward and having a spherical or nearly spherical top surface; a spherical surface contact member being in contact with the top surface of said spherical member and located above said leveling base; and a spring elastically pushing and supporting said leveling base upward for keeping the top surface of said spherical member in contact with said spherical surface contact member and allowing swinging movements of said leveling base around the contact point between said spherical member and said spherical surface contact member in said first and second directions.

2. The laser plumbing device according to claim 1, wherein said two-direction drive device includes a first motor for swinging said leveling base in said first direction; a first transmission mechanism for transmitting a drive force of said first motor to said leveling base for swinging said leveling base in said first direction; a second motor for swinging said leveling base in said second direction; and a second transmission mechanism for transmitting a drive force of said second motor to said leveling base for swinging said leveling base in said second direction.

3. The laser plumbing device according to claim 1, wherein said controller turns on said laser beam emitting device and controls the position of said laser beam emitting device by said two-direction drive device when said angle detected by said inclination angle detecting device is lower than or equal to a predetermined angle, and stops the operation of said laser beam emitting device and said two-direction drive device when the angle detected by said inclination angle detecting device is larger than said predetermined angle.

4. A long member plumbing device comprising:

a laser plumbing device for use in a plumbing operation of arranging a long member in a substantially vertical position and plumbing the arranged long member, including a laser beam emitting device; a supporting device for supporting said laser beam emitting device arranged in a position for emitting a laser beam vertically downward, and allowing swinging movements of said laser beam emitting device in a first direction crossing a laser beam emitting direction and a second direction crossing the laser beam emitting direction and being perpendicular to said first direction; a two-direction drive device for swinging said laser beam emitting device in said first and second directions; an inclination angle detecting device for detecting an inclination angle of said laser beam emitting direction with respect to a vertical axis; and a controller for controlling the position of said laser beam emitting device by said two-direction drive device so as to change said laser beam emitting direction toward the vertical axis based on the angle detected by said inclination angle detecting device; and an arm member provided with a reference position to be opposed to a laser beam outlet of the laser beam emitting device in said laser plumbing device, being capable of carrying said laser plumbing device such that the laser beam outlet is opposed to the reference position, and allowing fixing to an upper portion of said long member, wherein said supporting device of said laser beam emitting device in said laser plumbing device has a leveling base carrying said laser beam emitting device; a spherical member provided on said leveling base, projected upward and having a spherical or nearly spherical top surface; a spherical surface contact member being in contact with the top surface of said spherical member and located above said leveling base; and a spring elastically pushing and supporting said leveling base upward for keeping the top surface of said spherical member in contact with said spherical surface contact member and allowing swinging movements of said leveling base around the contact point between said spherical member and said spherical surface contact member in said first and second directions.

5. The long member plumbing device according to claim 4, wherein said two-direction drive device includes a first motor for swinging said leveling base in said first direction; a first transmission mechanism for transmitting a drive force of said first motor to said leveling base for swinging said leveling base in said first direction; a second motor for swinging said leveling base in said second direction; and a second transmission mechanism for transmitting a drive force of said second motor to said leveling base for swinging said leveling base in said second direction.

6. The long member plumbing device according to claim 4, wherein said controller in said laser plumbing device allows said laser beam emitting device to be turned on and controls the position of said laser beam emitting device by said two-direction drive device when said angle detected by said inclination angle detecting device is lower than or equal to a predetermined angle, and stops the operation of said laser beam emitting device and said two-direction drive device when the angle detected by said inclination angle detecting device is larger than said predetermined angle.

7. The long member plumbing device according to claim 6, wherein said arm member is provided with a magnet device for fixing said arm member to the long member.

8. The long member plumbing device according to claim 4, wherein said arm member is provided with a magnet device for fixing said arm member to the long member.

9. The long member plumbing device according to claim 4, wherein said arm member is provided with a magnet device for fixing said arm member to the long member.

10. A long member plumbing method for use in a plumbing operation of arranging a long member in a substantially vertical position and plumbing the arranged long member, comprising the steps of:

preparing a laser plumbing device including a laser beam emitting device; a supporting device for supporting said laser beam emitting device arranged in a position for emitting a laser beam vertically downward, and allowing swinging movements of said laser beam emitting device in a first direction crossing a laser beam emitting direction and a second direction crossing the laser beam emitting direction and being perpendicular to said first direction; a two-direction drive device for swinging said laser beam emitting device in said first and second directions; an inclination angle detecting device for detecting an inclination angle of said laser beam emitting direction with respect to a vertical axis; and a controller for controlling the position of said laser beam emitting device by said two-direction drive device so as to change said laser beam emitting direction toward the vertical axis based on the angle detected by said inclination angle detecting device;

fixing an arm member for carrying said laser plumbing device on an upper portion of the long member, said arm member being provided with a reference position to be opposed to a laser beam outlet of the laser beam emitting device in said laser plumbing device, and said reference position and a central axis of said long member being spaced from each other by a predetermined distance " in a predetermined direction X perpendicular to said central axis and by a predetermined distance $ in a direction Y perpendicular to said central axis and said predetermined direction X;

mounting said laser plumbing device on said arm member such that the laser beam outlet of said laser beam emitting device is opposed to said reference position;

providing a lower reference mark on a horizontal surface continuing to the lower portion of said long member or a horizontal surface lower than said horizontal surface, said lower reference mark being spaced from a point P to be coincident with said central axis of said long member by said distance " in a predetermined horizontal direction X' and by said distance $ in a horizontal direction Y' perpendicular to said direction X'; and emitting the laser beam downward from said laser beam emitting device of said laser plumbing device while keeping the central axis of said long member on said foregoing point P, and plumbing said long member by adjusting the position of the long member such that the laser beam is projected onto said lower reference mark, wherein said supporting device of said laser beam emitting device in said laser plumbing device has a leveling base carrying said laser beam emitting device; a spherical member provided on said leveling base, projected upward and having a spherical or nearly spherical top surface; a spherical surface contact member being in contact with the top surface of said spherical member and located above said leveling base; and a spring elastically pushing and supporting said leveling base upward for keeping the top surface of said spherical member in contact with said spherical surface contact member and allowing swinging movements of said leveling base around the contact point between said spherical member and said spherical surface contact member in said first and second directions.

11. The long member plumbing method according to claim 10, wherein said two-direction drive device includes a first motor for swinging said leveling base in said first direction; a first transmission mechanism for transmitting a drive force of said first motor to said leveling base for swinging said leveling base in said first direction; a second motor for swinging said leveling base in said second direction; and a second transmission mechanism for transmitting a drive force of said second motor to said leveling base for swinging said leveling base in said second direction.

12. The long member plumbing device according to claim 11, wherein said arm member is provided with a magnet device for fixing said arm member to the long member.

13. The long member plumbing method according to claim 10, wherein said controller in said laser plumbing device allows said laser beam emitting device to be turned on and controls the position of said laser beam emitting device by said two-direction drive device when said angle detected by said inclination angle detecting device is lower than or equal to a predetermined angle, and stops the operation of said laser beam emitting device and said two-direction drive device when the angle detected by said inclination angle detecting device is larger than said predetermined angle.

14. The long member plumbing device according to claim 13, wherein said arm member is provided with a magnet device for fixing said arm member to the long member.

15. The long member plumbing method according to claim 10, wherein said arm member is provided with a magnet device for fixing said arm member to the long member.

\* \* \* \* \*